United States Patent [19]

Giannuzzi

[11] 4,197,781
[45] Apr. 15, 1980

[54] SCREW ANCHOR

[76] Inventor: Louis N. Giannuzzi, 4 Shelter Dr., Cos Cob, Conn. 06807

[21] Appl. No.: 897,368

[22] Filed: Apr. 18, 1978

[51] Int. Cl.² .......................................... F16B 35/04
[52] U.S. Cl. ........................................ 85/3 S; 85/71; 85/80; 85/82
[58] Field of Search ................... 85/3 R, 3 K, 35, 70, 85/71, 80, 81, 82, 83

[56] References Cited

U.S. PATENT DOCUMENTS

| 761,277 | 5/1904 | Wilbur | 85/3 R X |
|---|---|---|---|
| 1,106,983 | 8/1914 | Steiner | 85/3 R X |
| 1,295,734 | 2/1919 | Greubel | 85/71 |
| 2,610,013 | 9/1952 | Gibson | 85/71 X |
| 2,897,694 | 8/1959 | Carney | 85/35 X |
| 3,143,916 | 8/1964 | Rice | 85/71 |
| 3,213,745 | 10/1965 | Dwyer | 85/80 |
| 3,213,746 | 10/1965 | Dwyer | 85/80 |
| 3,487,746 | 1/1970 | Kapnek | 85/71 |
| 3,651,734 | 3/1972 | McSherry | 85/80 |
| 4,079,655 | 3/1978 | Robertson | 85/35 |

FOREIGN PATENT DOCUMENTS

| 144117 | 11/1951 | Australia | 85/71 |
|---|---|---|---|
| 406147 | 10/1943 | Italy | 85/3 R |

*Primary Examiner*—Thomas J. Holko
*Attorney, Agent, or Firm*—Michael Ebert

[57] ABSTRACT

A removable and reusable plastic screw anchor for fastening fixtures and other objects to a hollow wall. The anchor includes a four-legged diamond-shaped shank whose front legs are joined together by a front apex hinge and whose rear legs are joined to the front legs by side apex hinges, the ends of the rear legs defining a rear apex. Secured by a pair of normally outstretched resilient webs to the rear legs of the shank is a flanged socket whose bore lies in registration with an opening formed in the front apex hinge. The diamond-shaped shank is collapsible to form a tongue that is insertable in a hole drilled in the wall to accommodate the socket, the webs then reverting to their outstretched condition to cause the shank which is now behind the wall to recover its diamond formation. When a self-tappping screw is turned into the socket bore, it acts to thread the bore. As the screw proceeds beyond the bore, it compels the shank to assume the configuration of a triangular truss whose bottom chord is defined by the rear legs and is pressed against the inner surface of the wall, the truss having a central strut formed by the screw when it extends between the front apex and the socket. To remove the anchor from the hollow wall, one simply withdraws the screw to permit collapse of the truss. The same anchor may be inserted in its tongue configuration in a hole drilled in a solid wall, the screw then serving to dilate the legs to wedge the tongue in the hole.

14 Claims, 21 Drawing Figures

U.S. Patent  Apr. 15, 1980  Sheet 1 of 3  4,197,781
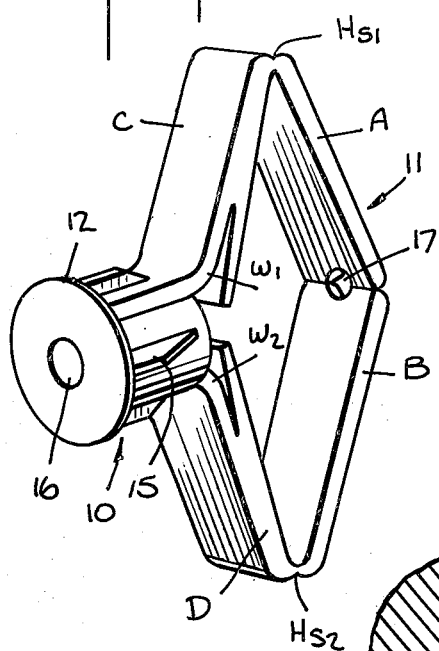
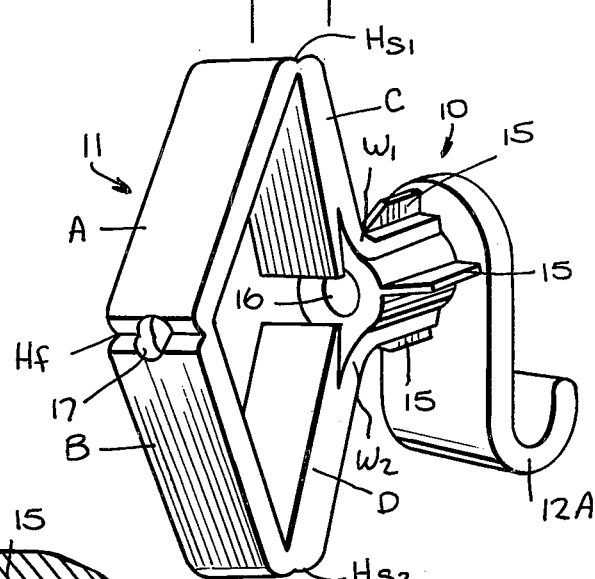
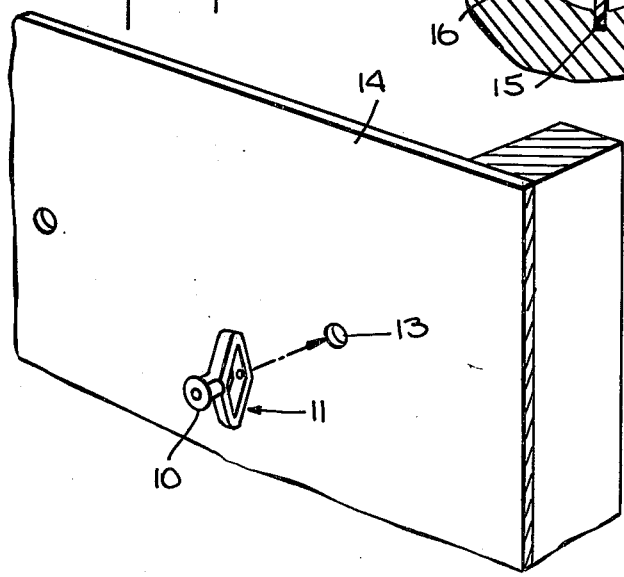
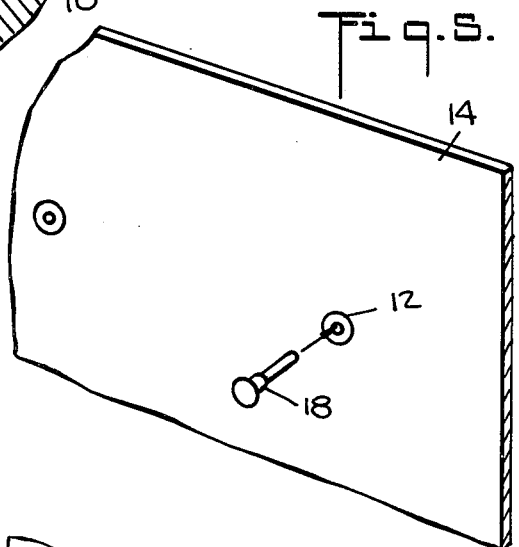
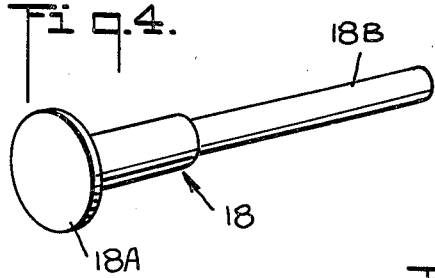
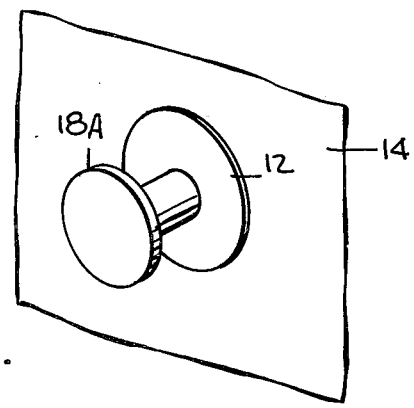

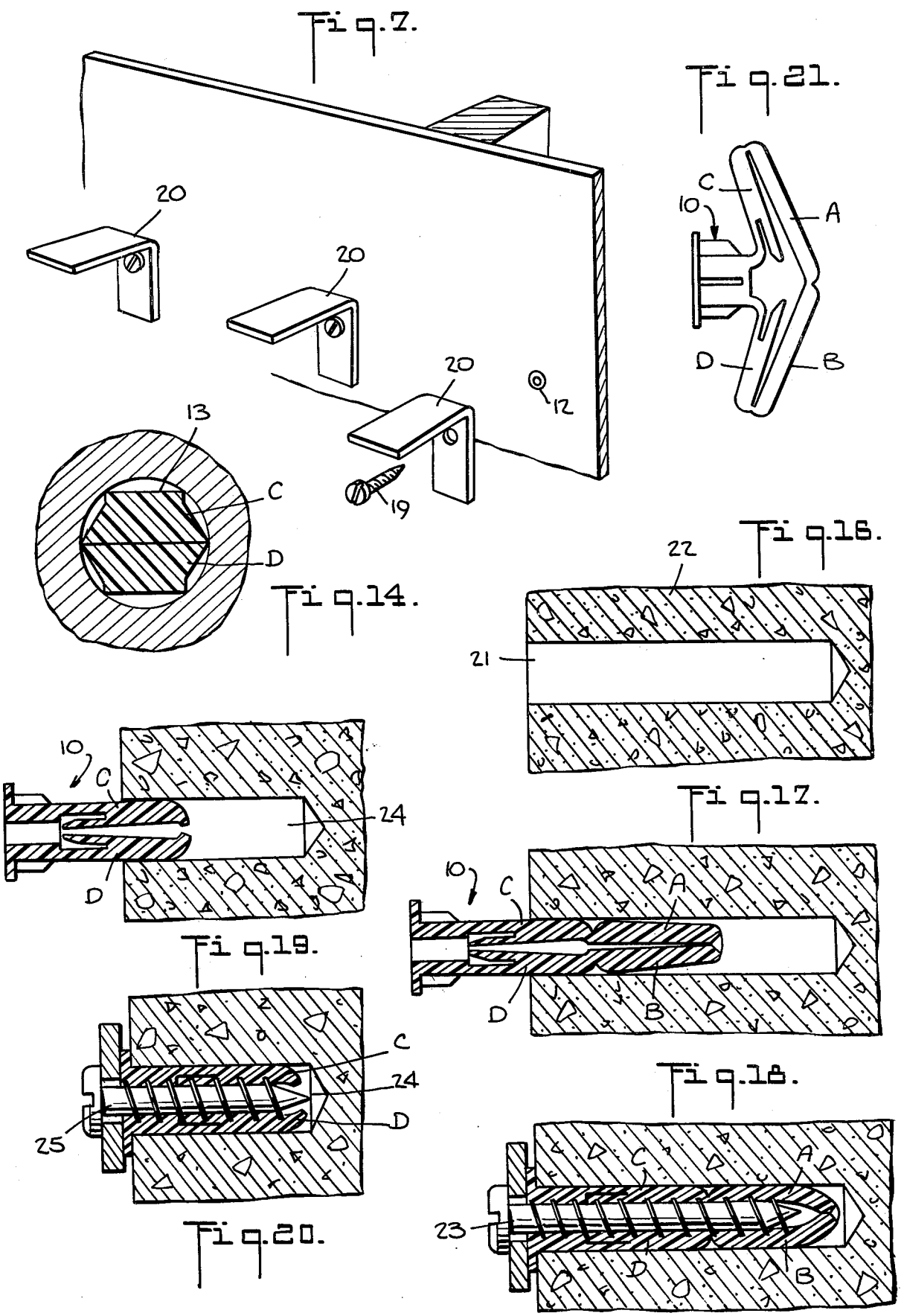

SCREW ANCHOR

BACKGROUND OF INVENTION

This invention relates generally to screw anchors for fastening fixtures and other objects to both hollow and solid walls, and more particularly to a removable and reusable plastic anchor constituted by a socket and a diamond-shaped shank extending therefrom, the shank being compressible to form a tongue that is insertable in a hole drilled in the wall to accommodate the socket.

In hollow walls formed of plaster board, "Sheetrock," plywood and other relatively thin panel material, one is often faced with the problem of mounting on the wall drapery transverse rods, lighting fixtures and other objects which impose a heavy stress on the wall. Such walls are usually incapable of retaining standard screws, and it is for this reason that an anchoring socket of some sort is required in order to secure a screw to the wall to afford a strong and reliable fixture installation.

The nature of the anchoring socket must be such that it is adapted to engage the inner surface of the hollow wall so that the socket cannot be pulled out and will not twist when the screw is inserted and taken up to secure the fixture to the wall.

One commonly used screw anchor makes use of a metal sleeve which is longitudinally split to create parallel ribs extending between a flanged front socket received in a hole drilled in the wall and a rear socket, the rear socket being threaded. The arrangement is such that when a screw is inserted to engage the rear socket, turning of the screw causes the ribs to deform and to flare out until they are drawn flush with the interior surface of the wall. The flaring of the ribs spreads the load over a relatively wide area of the wall adjacent the hole drilled therein.

One major objection to a metal screw anchor of this type is that there is no efficient way of removing the anchor from the wall; for once the ribs are deformed to their flared condition, they cannot be straightened. Hence to remove the screw anchor, one must break the flange off the front socket and push the remainder of the screw anchor into the wall. This not only destroys the screw anchor so that it cannot be reused, but damage is often done to the wall in an attempt to remove the flange.

To overcome the drawbacks of conventional screw anchors, the patent to Kapnek, U.S. Pat. No. 3,487,746 discloses an anchor formed by parallel ribs which are pivotally secured to front and rear sockets, a spring causing the ribs to pivot and to be held tight against the interior of the wall. The anchor can be straightened out by the insertion of a screw to expand the spring, thereby permitting the withdrawal of the anchor from a hole made in the wall. While an anchor of this type is removable and reusable, its relatively complex structure makes the manufacture and assembly thereof expensive. Moreover, an anchor of the Kapnek type is not usable in solid walls.

Dwyer, in his U.S. Pat. No. 3,213,746, discloses a less costly screw anchor which is molded of plastic material. The anchor includes a flexible web member with a wish-bone-like shape which, when a screw is inserted, spreads apart to hold the socket of the anchor in the wall. In this arrangement, the inner surface of the wall is engaged only by teeth formed on the sloped surfaces of the webs in a small area surrounding the hole, so that the load is concentrated in this area rather than over the broad area required to distribute the load. Such load distribution is essential with relatively weak plaster board and the like; for otherwise a heavy load imposed on the anchor will pull the anchor out of the hole.

Still another approach is that disclosed in the McSherry U.S. Pat. No. 3,651,734 in which a screw socket received in the hole in the wall is coupled to a toggle lock. When collapsed, this toggle is insertable through the hole. When expanded to an over-center stable position, the toggle acts to lock the anchor within the hole. One serious drawback of this anchor arrangement is that once installed it cannot be easily removed.

SUMMARY OF INVENTION

In view of the foregoing, the main object of this invention is to provide an improved screw anchor which is formed of plastic material, the anchor being removable and reusable.

More particularly, it is an object of this invention to provide a screw anchor which when installed in a hollow wall is securely held thereto by a truss whose bottom chord engages the inner surface of the wall over a relatively broad area, whereby the anchor is capable of sustaining exceptionally heavy loads.

Also an object of this invention is to provide a screw anchor whose truss can be quickly collapsed to permit ready removal of the anchor from the wall without in any way doing damage thereto.

Yet another object of the invention is to provide an anchor which can be installed in either a hollow wall or a solid wall to support objects therefrom.

A significant feature of the invention resides in the ability of the anchor, when installed in a solid wall, to be used in connection with a shallow hole drilled in this wall or in a deep hole therein. The anchor is capable of being shortened in length for insertion in a shallow hole which is less costly to prepare, or to be retained in full length for insertion in a deep hole for greater holding power.

Still another object of the invention is to provide a plastic screw anchor which operates efficiently and reliably and which may be mass-produced at low cost.

Briefly stated, a removable and reusable screw anchor in accordance with the invention includes a four-legged diamond-shaped shank whose front legs are joined together by a front apex hinge having an opening therein and whose rear legs are joined to the front legs by side apex hinges, the ends of the rear legs defining a rear apex. Secured by a pair of normally outstretched resilient webs to the rear legs of the shank is a flanged socket whose bore lies in registration with an opening formed in the front apex hinge.

The shank is collapsible against the tension of the webs to form a tongue that is insertable in a hole drilled in a hollow wall to accommodate the socket, the webs then reverting to their outstretched condition to cause the shank which is now behind the wall to resume its diamond formation. When a self-tapping screw is turned into the socket bore, it acts to thread the bore, the turning screw then advancing to engage the ends of the rear legs and to spread them apart to transform the shank into a triangular truss whose bottom chord is defined by the rear legs and is pressed against the inner surface of the wall. The point of the advancing screw finally enters and threads the opening in the front apex to define a central strut extending between the front apex of the truss and the socket. To remove the anchor from the wall, one simply withdraws the screw to permit collapse of the truss.

The same anchor is insertable in its tongue configuration in a hole drilled in a solid wall, the screw then serving to wedge the tongue in the hole. The anchor for this purpose may be shortened by tearing off the front legs of the tongue.

OUTLINE OF DRAWINGS

For a better understanding of the invention as well as other objects and further features thereof, reference is made to the following detailed description to be read in conjunction with the accompanying drawings, wherein:

FIG. 1 is a perspective view of a screw anchor in accordance with the invention as seen looking toward its socket;

FIG. 2 is a perspective view of the same screw anchor as seen looking toward its shank, the anchor in this instance being modified to incorporate a wall mounting fixture;

FIG. 3 illustrates a hollow wall having a hole drilled therein to receive the screw anchor;

FIG. 4 is a perspective view of a pin which is insertable in the anchor to prepare the anchor for screw insertion;

FIG. 5 shows the screw anchor installed in a hole in the hollow wall, the pin being inserted therein;

FIG. 6 shows the pin in the fully-inserted state;

FIG. 7 shows a hollow wall having screw anchors installed therein for securing brackets to the wall;

FIG. 14 is a transverse section taken through the compressed shank of the anchor in the plane indicated by line 14—14 in FIG. 10 to show its geometry relative to the wall hole;

FIG. 15 is a transverse section taken through the anchor socket in the plane indicated by line 15—15 in FIG. 11 to show its geometry relative to the wall hole;

FIG. 16 shows a deep hole drilled in masonry to receive the screw anchor;

FIG. 17 shows the screw anchor being inserted in the deep masonry hole;

FIG. 18 shows the screw inserted in the anchor to wedge the anchor in the deep hole;

FIG. 19 is a short hole drilled in masonry to receive a truncated screw anchor;

FIG. 20 shows the screw inserted in the truncated screw anchor; and

FIG. 21 shows the configuration of the anchor when it leaves the injection mold.

DESCRIPTION OF INVENTION

Figure 8:
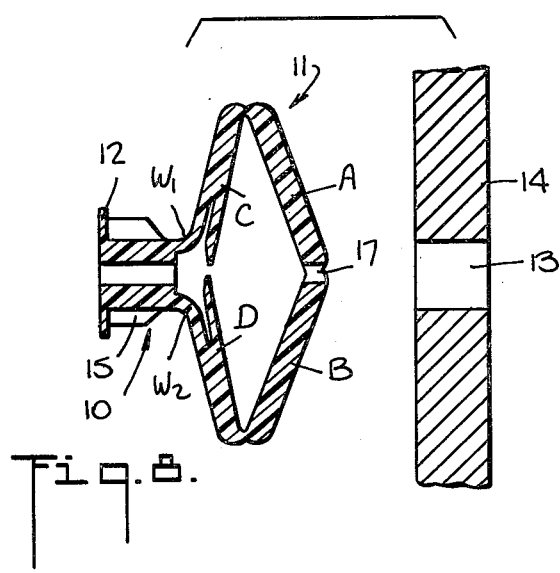
FIG. 8 shows the initial step in installing the screw anchor in a hole drilled in a hollow wall.

Referring now to FIGS. 1 and 2, there is shown a preferred embodiment of a screw anchor in accordance with the invention, the anchor being molded or otherwise fabricated of a resilient synthetic plastic material such as polypropylene, nylon or any other material which has acceptable structural characteristics. The anchor is constituted by a socket, generally designated by numeral 10, and a compressible shank, generally designated by numeral 11.

The front face of socket 10 is provided with a circular flange 12 whose diameter is greater than that of the body of the socket. Thus when the socket is seated within a hole 13 drilled in a hollow wall 14, as shown in FIG. 3, whose diameter is just sufficient to accommodate the body of the socket, flange 12 then rests against the outer surface of the wall, as shown in FIG. 5, so that the socket cannot be pushed through the hole.

Socket 10 is provided with a set of four sharp fins 15 at 90 degree positions, the fins having sloping cutting edges such that when the socket is pushed into a drilled hole in a plaster or similar hollow wall, the fins cut into the plaster surrounding the hole to stabilize the socket and prevent rotation thereof. Socket 10 includes a longitudinal bore 16 adapted to receive a self-tapping screw in a manner to be later described.

Shank 11 is constituted by a pair of front legs A and B pivotally joined to a shorter pair of rear legs C and D, these legs assuming a diamond-like formation in the normal or erect state of the shank. Leg A is connected to leg B by a front apex hinge $H_f$ having an opening 17 therein which lies in axial registration with the bore 16 in socket 10. Front legs A and B are joined to rear legs C and D by side apex hinges $H_{s1}$ and $H_{s2}$, respectively. The rear legs C and D at the rear apex are unjoined and therefore have free ends. The three hinges are preferably in the form of living hinges integral with the plastic legs of the shank.

Figure 9:
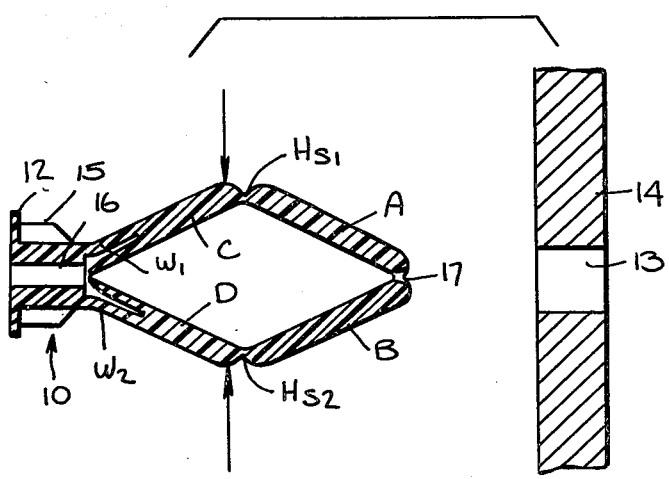
FIG. 9 shows the next step in which the screw anchor is compressed to form an insertion tongue.
Figure 12:
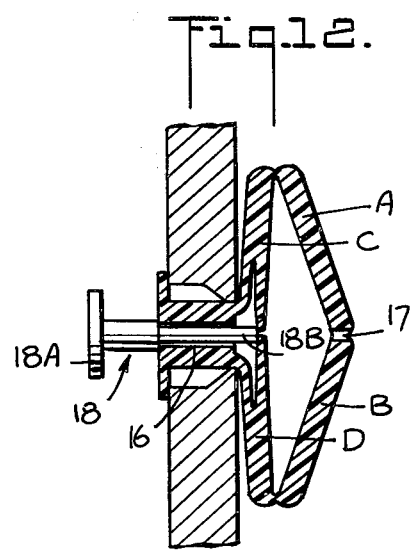
FIG. 12 illustrates the action of the pin.
Figure 10:
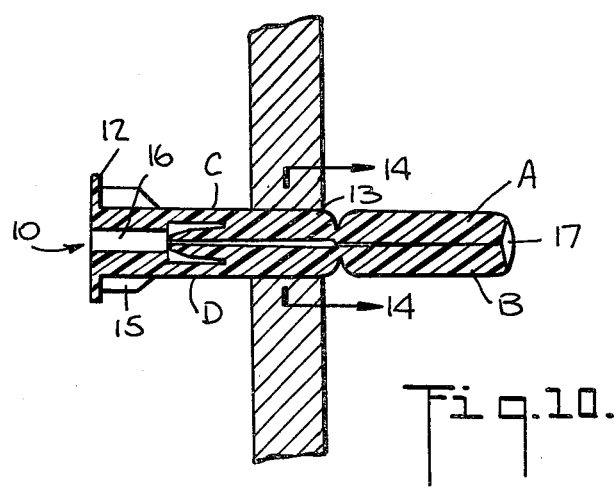
FIG. 10 shows the succeeding step in which the tongue is inserted in the hole.

Socket 10 is attached to shank 11 by a pair of normally-outstretched resilient webs $W_1$ and $W_2$ which are integral with rear legs C and D and merge therewith at a point removed from the free ends of those legs. Resilient webs $W_1$ and $W_2$ normally maintain the shank erect to assume the diamond-like configuration shown in FIG. 8. But because the legs of the shank are hinged together, the shank is collapsible and it becomes possible, as indicated in FIG. 9, to compress the shank by squeezing it with the fingers. This is done by applying finger pressure at the side apex hinges $H_{s1}$ and $H_{s2}$ in opposing directions, as indicated by the arrows. This acts to flatten out the legs and thereby create a tongue, as shown in FIG. 10, making it possible to insert the shank in hole 13 drilled in wall 14.

Figure 11:
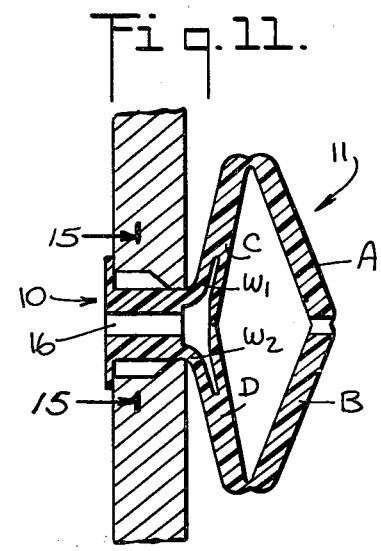
FIG. 11 illustrates the condition of the anchor after insertion in the hole with the socket seated therein.

When, as shown in FIG. 11, socket 10 is seated within hole 13, the shank which is now beyond the hole is no longer confined and is released. Because of the inherent memory of webs $W_1$ and $W_2$, the shank is caused to again assume its diamond-like erect configuration. However, since the shank had previously been compressed and webs $W_1$ and $W_2$ may not have sufficient memory to fully restore the erect diamond, the free end of legs C and D are at this point quite close together and the rear legs are therefore angled and not adjacent to the inner surface of the wall.

In order, therefore, to position the rear legs so that they lie closer to the inner surface of the wall, use is made of a pin 18. This pin, as shown in FIGS. 4, 5 and 6, has a head 18A and a front section 18B of reduced diameter which is receivable within socket bore 16. The length of front section 18B is long enough to extend into the shank to engage the rear apex of the diamond. By pushing this rear apex in the direction of the front apex, the rear legs are caused to assume their desired positions.

Figure 13:
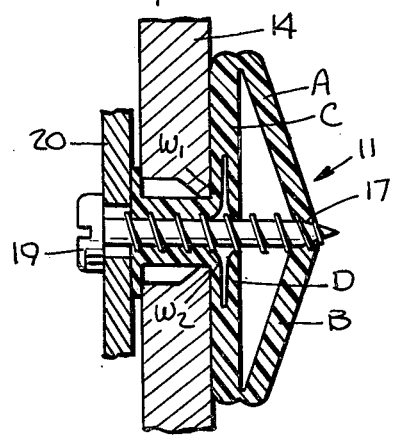
FIG. 13 shows the screw inserted in the anchor to create a holding truss.

When a self-tapping screw 19, as shown in FIG. 13, is turned into bore 16 of socket 10 to secure a bracket 20 or other object-holding means to the outer surface of hollow wall 14, screw 19 first acts to thread the bore. As one continues to turn in the screw, it engages the rear legs of the shank and spreads them apart to transform the shank into a triangular truss whose bottom chord is pressed against the inner surface of wall 14, this chord being defined by rear legs C and D which are now in the same plane.

Finally, the point of the advancing screw enters and threads the opening 17 in the front apex to define a central strut or beam extending between the front apex of the truss and the socket joined to the bottom chord of the truss. This produces a truss of high strength which lies flat against the inner surface of the wall over a relatively broad zone to impart exceptional holding power to the screw anchor and to render it capable of sutaining very heavy loads.

While the ends of the rear legs C and B which form the rear apex are shown as free, in practice these legs may be joined by living hinge, in which case it is necessary to provide a hole in the hinge to receive the advancing screw which then acts to dilate the hole to spread apart the legs.

But if one wishes to remove the anchor from the wall for subsequent reuse, this can be done merely by turning out the screw, thereby making it possible to collapse the truss and to cause the shank to assume its tongue-like formation when pulling the anchor out of the hole. FIG. 7 shows three brackets 20 mounted in the wall by three screw anchors in accordance with the invention. It is a simple matter not only to install these brackets but also to remove them and the screw anchors.

Instead of separate brackets, the screw anchor, as shown in FIG. 2, may include a mounting fixture in hook-like form integral with flange 12, making it possible to suspend an object from the wall without the need to couple a fixture for this purpose to the screw.

The dimensions of the screw anchor must, of course, take into account the thickness of the hollow wall for which it is intended. However, these dimensions are not critical in that the flexible webs allow some degree of play; for if the thickness of the wall is such that the socket of the screw anchor seated in a hole in the wall falls short of the inner surface of the wall, the webs supply the necessary extension.

FIG. 14 is a transverse section taken through the rear legs C and D in the plane indicated by lines 14—14 in FIG. 10. It will be seen that the legs have complementary, generally trapezoidal cross-sections. The front legs also have a trapezoidal cross-sectional form. When the screw anchor is used in conjunction with a hole 21 drilled in a solid masonry body such as a concrete wall, as shown in FIG. 16, the trapezoidal form of the legs serves to provide a greater contact area with the lining of the hole. Thus when the screw anchor is installed in the hole, as shown in FIG. 17, and a screw 23 is turned into the anchor, as shown in FIG. 18, it acts to dilate the tongue formed by the legs and to cause the tongue to wedge the anchor into the hole.

In some instances, it is not desirable or possible to drill a hole in a concrete wall of sufficient depth to receive the full length of the screw anchor tongue. But because the shank of the anchor is formed by front legs A and B joined to rear legs C and D by living plastic hinges which have relatively low shear strength, one can tear off and discard the front legs and thereby provide a shortened or truncated screw anchor, as shown in FIG. 19. This is usable in connection with a shallow hole 24 whose depth is sufficient for rear legs C and D and for a short screw 25 which serves to wedge the truncated anchor within the hole.

The screw anchors in accordance with the invention are preferably fabricated of low-cost injection molding techniques. For this purpose, use is made of a mold whose configuration produces, as shown in FIG. 21, an anchor in which the rear legs C and D of the shank are folded to form swept back wings, so that the webs $W_1$ and $W_2$ which connect the socket to the shank are then reversely curved.

Because legs C and D are molded in this fashion, the plastic memory required of webs $W_1$ and $W_2$ is reduced, so that when the anchor shank is later caused to assume a tongue formation for hole insertion, in which condition the webs are flexed to take on a straight form and the tongue is thereafter released when it passes beyond the hole, the shank, because of the memory of the webs, will then assume the desired truss configuration.

While there has been shown and described a preferred embodiment of a hollow wall anchor in accordance with the invention, it will be appreciated that many changes and modifications may be made therein without, however, departing from the essential spirit thereof. Thus while the anchor has been described in connection with a self-tapping screw, in practice an ordinary screw may be used in conjunction with a threaded bore.

I claim:

1. A multiple-function screw anchor for installation either in a hole drilled in a hollow wall or in a shallow or deep cavity drilled in a solid wall to support an object therefrom, said anchor comprising:

A. a shank constituted by a pair of front legs and a pair of rear legs in a diamond-like configuration, said front legs being hinged together by a front apex hinge, said front legs being joined to said rear legs by frangible side apex hinges, the ends of said rear legs defining a rear apex;

B. a socket attached to said shank adjacent said rear apex by a pair of normally outstretched resilient webs that merge with said rear legs, whereby when said diamond-like shank is compressed at said side apex hinges, it is transformed into a tongue which is insertable in said hole, making it possible to seat said socket therein, said shank, after passing through the hole, then being caused by the webs to resume its diamond-like configuration, said socket having a bore in registration with said front apex opening; and C. a screw which is turnable into said bore and is threadably engaged thereby, the turning screw then advancing to engage the ends of said rear legs and to spread them apart to transform the shank into a truss whose bottom chord is formed by said rear legs and is pressed against the inner surface of said hollow wall to prevent removal of said anchor, the point of said advancing screw then entering and threadably engaging the front apex hinge to define a central strut between the front apex of the truss and the socket, whereby the truss may be collapsed by withdrawal of the screw to permit removal of the anchor from the hole, said compressed shank being also insertable in said deep cavity to provide a solid wall anchor, said frangible side apex hinges being relatively weak to permit a user to break off the front legs of said shank to provide a shortened shank constituted by said rear legs which is insertable in said shallow cavity to provide a solid wall anchor.

2. An anchor as set forth in claim 1, wherein said ends of the rear legs are unjoined to define a free rear apex.

3. An anchor as set forth in claim 1, wherein said front and rear pairs of legs have a complementary generally trapezoidal cross-section.

4. An anchor as set forth in claim 1, wherein the anchor is molded of synthetic plastic material and said hinges are living hinges.

5. An anchor as set forth in claim 4, wherein said plastic material is polypropylene.

6. An anchor as set forth in claim 5, wherein said webs are formed of a plastic material which have a memory whereby when the webs are flexed and released, the webs are caused to return to their normal state.

7. An anchor as set forth in claim 6, wherein said rear legs are molded in a reversely-curved configuration to enhance the memory of the webs.

8. An anchor as set forth in claim 1, wherein said socket has a front face flange which lies against the outer surface of the wall.

9. An anchor as set forth in claim 8, wherein said flange has a mounting fixture integral therewith for supporting an object.

10. An anchor as set forth in claim 1, wherein said socket is provided with fins which cut into the wall surrounding said hole to prevent rotation thereof.

11. An anchor as set forth in claim 1, further including a pin insertable in said bore to position the rear apex preparatory to the insertion of said screw when said anchor is used in a hole in a hollow wall.

12. An anchor as set forth in claim 1, wherein said rear legs are shorter than said front legs to create a triangular truss when said anchor is used in a hole in a hollow wall.

13. An anchor as set forth in claim 1, wherein said screw is a self-tapping screw which threads said bore and said rear apex hinge.

14. An anchor as set forth in claim 13, wherein said rear apex hinge is provided with an opening which is threaded by said screw.

* * * * *